April 28, 1942.   R. B. COTTRELL   2,281,270
DRAFT GEAR
Filed May 24, 1940   5 Sheets-Sheet 1
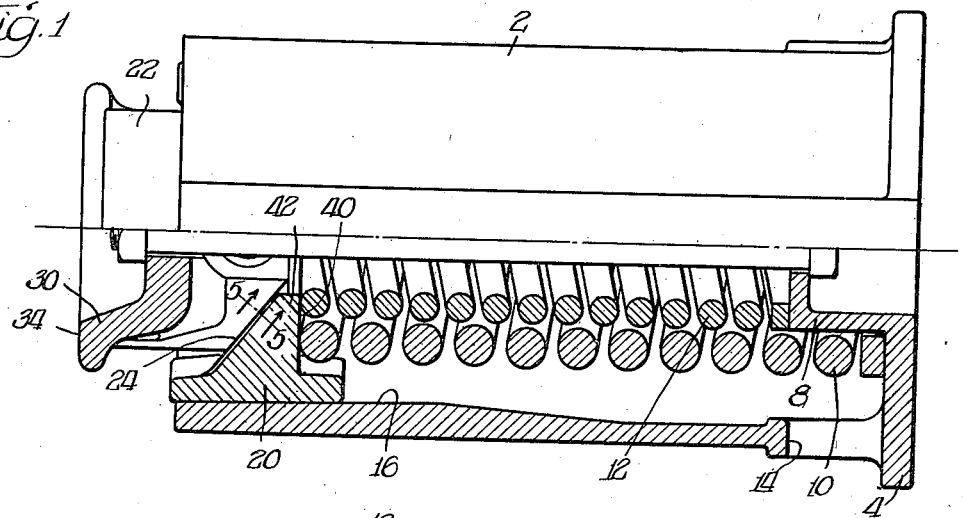
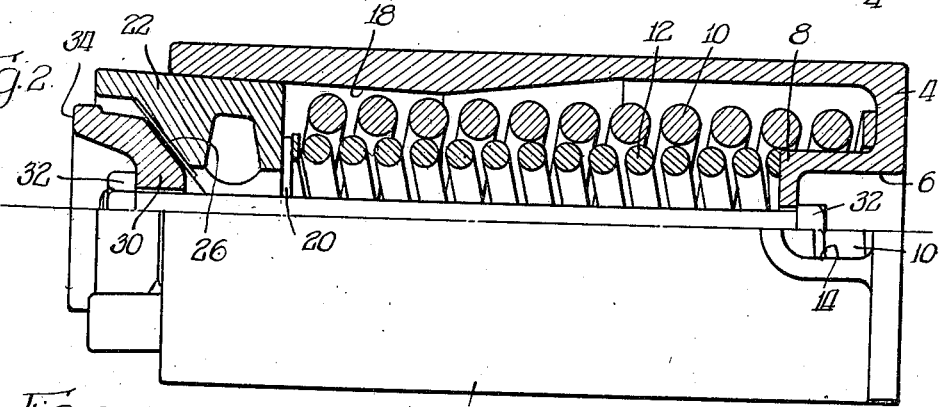
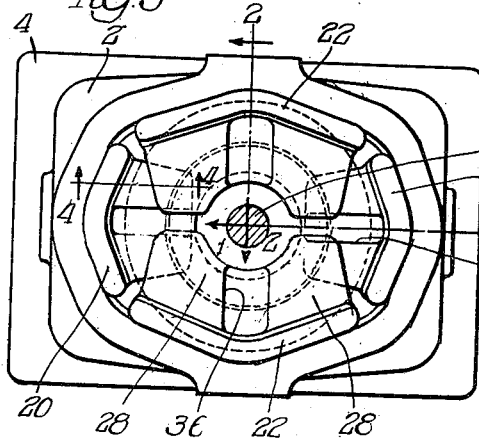
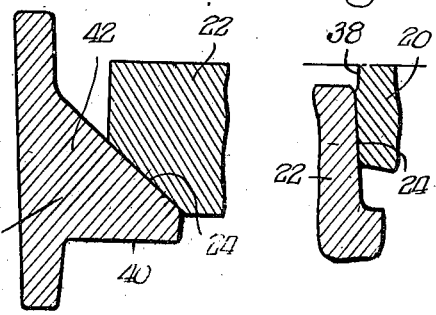
INVENTOR.
Robert B Cottrell, April 28, 1942. R. B. COTTRELL 2,281,270
DRAFT GEAR
Filed May 24, 1940 5 Sheets-Sheet 2
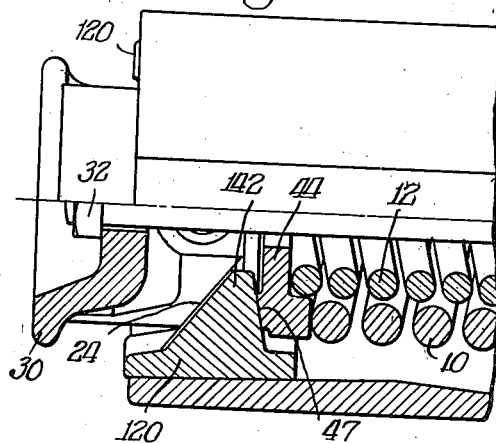
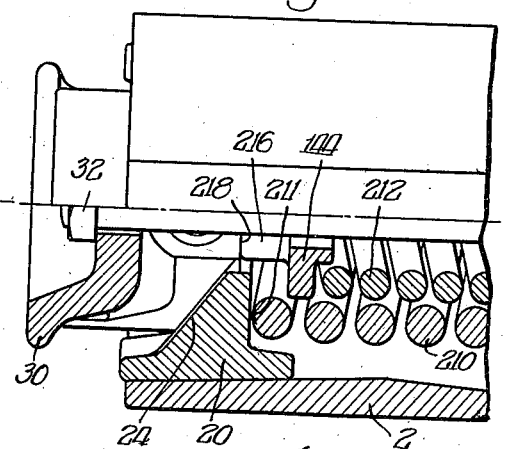
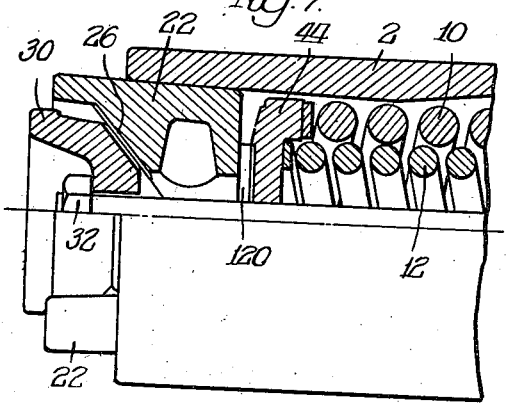
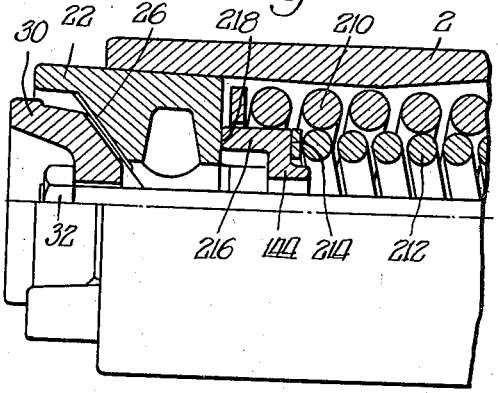
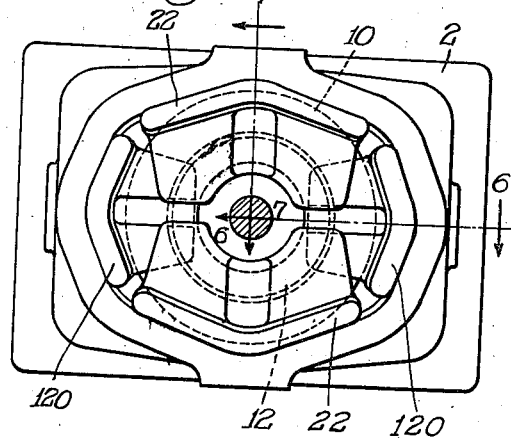
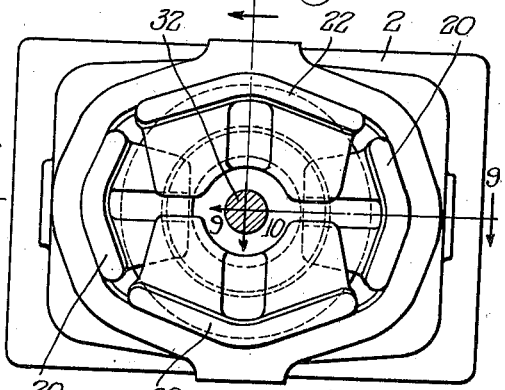
INVENTOR.
Robert B Cottrell,
BY
attorney April 28, 1942. R. B. COTTRELL 2,281,270
DRAFT GEAR
Filed May 24, 1940 5 Sheets-Sheet 3
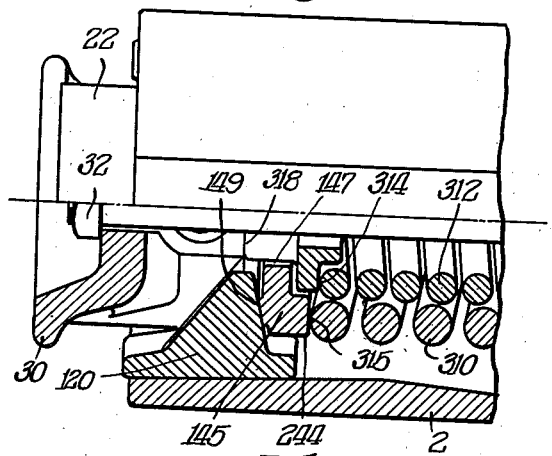
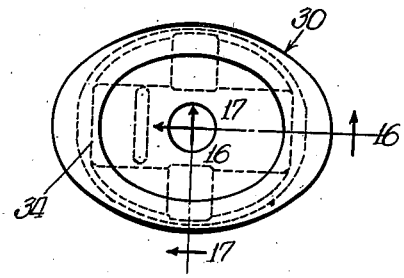
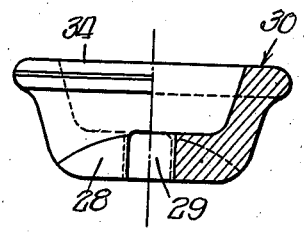
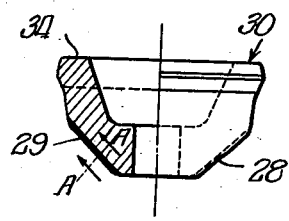
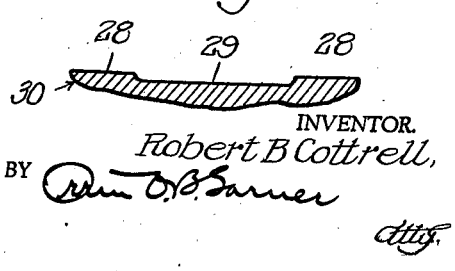
INVENTOR.
Robert B Cottrell,
BY
ATTY.

April 28, 1942.  R. B. COTTRELL  2,281,270
DRAFT GEAR
Filed May 24, 1940  5 Sheets-Sheet 4
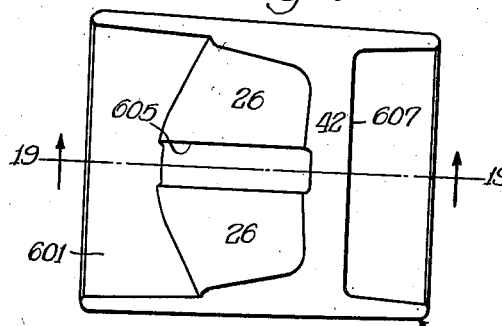
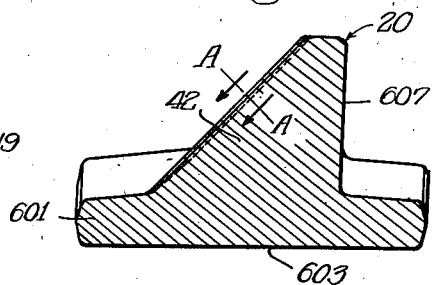
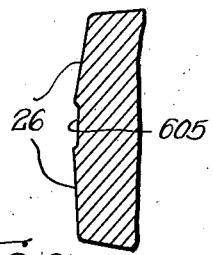
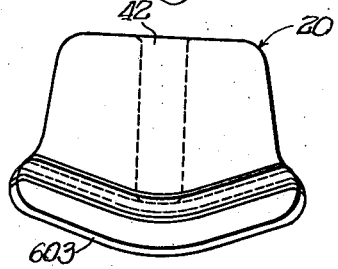
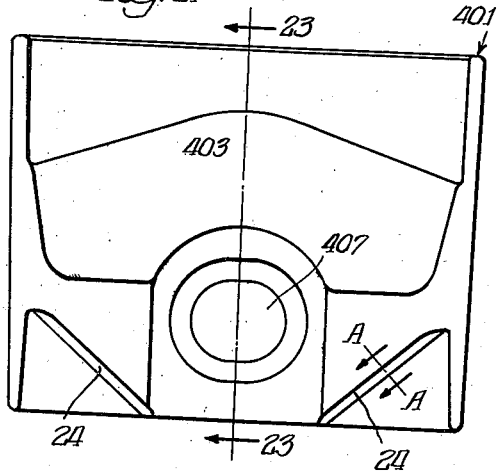
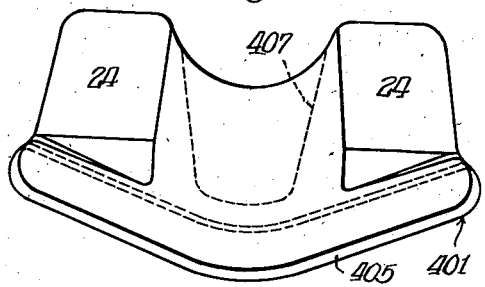
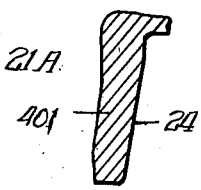
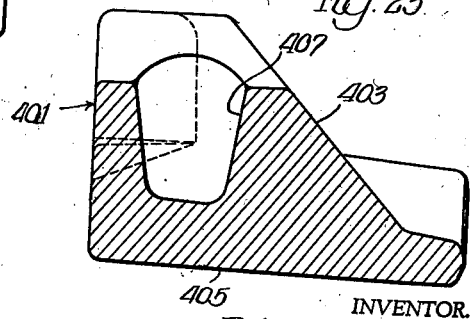
INVENTOR.
Robert B Cottrell,
BY
atty.

April 28, 1942.    R. B. COTTRELL    2,281,270
DRAFT GEAR
Filed May 24, 1940    5 Sheets-Sheet 5
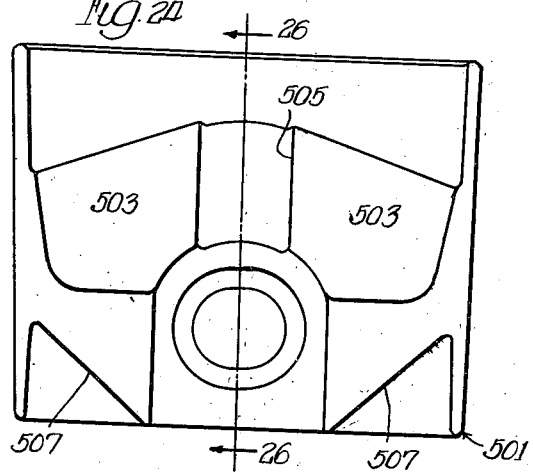
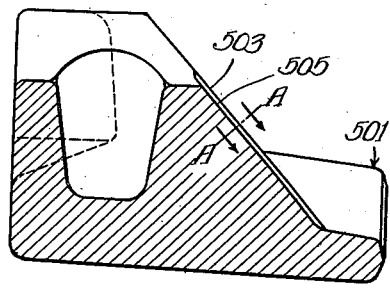
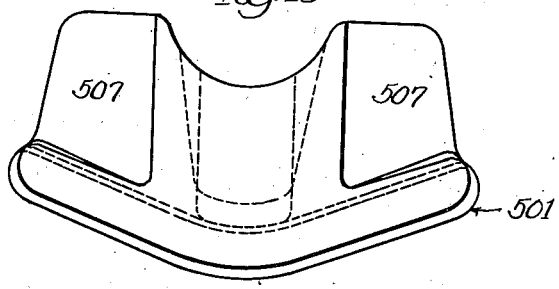
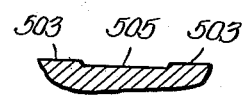
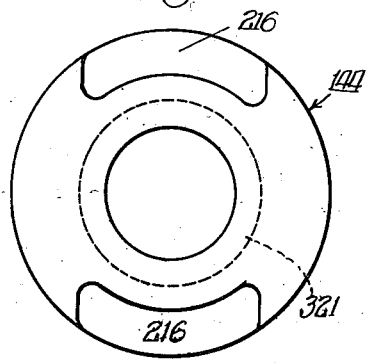
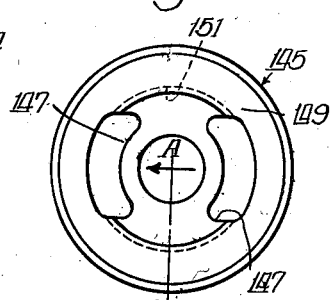
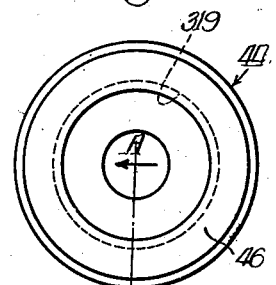
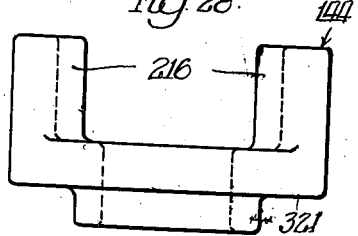
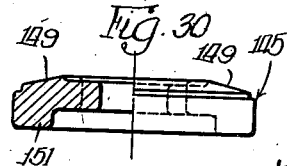
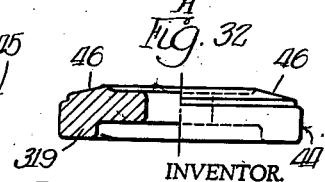
INVENTOR.
Robert B Cottrell,
BY
atty.

Patented Apr. 28, 1942

2,281,270

UNITED STATES PATENT OFFICE 2,281,270

DRAFT GEAR

Robert B. Cottrell, Chicago, Ill., assignor to American Steel Foundries, Chicago, Ill., a corporation of New Jersey Application May 24, 1940, Serial No. 337,013

27 Claims. (Cl. 213—32)

My invention relates to a friction absorbing device of a type commonly used in railway cars and is sometimes more particularly described as a draft gear of the clutch type having a housing, a compression spring, and a clutch mechanism including shoes having frictional engagement against said housing and a follower extending beyond said housing for abutment with the usual follower block.

My invention relates more particularly to an improved type of such mechanism, the generic form of which has been set forth in my United States Letters Patent No. 2,207,287, issued July 9, 1940, Draft gear. The said generic disclosure illustrates a so-called series type of gear wherein a plurality of sets of shoes are aligned along diameters of said housing with said diameters rotated 90° with respect to each other, one set of said shoes having abutment with a compression spring, the other set of said shoes engaging a wedge follower. For the purpose of record reference is hereby made to my United States Letters Patent No. 2,212,365, co-pending herewith and issued August 20, 1940, said patent showing a modification of said generic form.

In the improved modification shown herein, pressure from the inner set of shoes is compounded into the outer set of shoes by direct engagement of one set of shoes with the other set of shoes, and the outer set of shoes is afforded a relatively large area as compounded with the shoes of the other set in order to equalize the pressure per unit area as between the housing and all of the shoes. In the improved arrangement I have shown, the pressure exerted by the spring is compounded from the inner set of shoes to the outer set of shoes, and a cross-equalization of pressure between the respective sets of shoes is afforded by interposing each shoe of each set between the two shoes of the other set, with all of said shoes in frictional thrust engagement with the oval end.

An object of my invention is to devise such a structure as that above described wherein the engaging surfaces between the shoes of respective sets may be diagonally arranged with respect to the axis of the gear and wherein the surface on each shoe affording engagement with an abutting shoe comprises two spaced areas lying in diverging planes.

My invention comprehends such an arrangement as that described wherein a plurality of compression springs may be used within the housing and wherein a spring cap may be afforded diagonal face engagement with the shoes of one set. Also, modifying arrangements wherein a composite spring cap may be used so arranged as to permit one compression spring to operate against one set of shoes and the other compression spring to operate against the other set of shoes.

My invention also contemplates such a series clutch arrangement as that above described wherein spaced engaging areas are afforded between the follower and each shoe of the outer set.

Figure 1 is a top plan view, half in section, of a draft gear embodying my invention, the section being taken substantially in the horizontal plane bisecting the device and as indicated by the line 1—1 of Figure 3.

Figure 2 is a side elevation of the friction device shown in Figure 1, half in section, the section being taken substantially in the vertical plane bisecting the device as indicated by the line 2—2 of Figure 3.

Figure 3 is an end view of the device shown in Figures 1 and 2 with the follower wedge removed.

Figure 4 is a fragmentary sectional view through the engaging surfaces of abutting inner and outer friction shoes, the section being taken substantially in the plane indicated by the line 4—4 of Figure 3.

Figure 5 is a further fragmentary sectional view taken through engaging surfaces of abutting friction shoes in the plane substantially as indicated by the line 5—5 of Figure 1.

Figure 6 is a fragmentary top plan view corresponding in general to Figure 1 but showing a further modification, the view being half in section, with the section taken substantially in the horizontal plane indicated by the line 6—6 of Figure 8.

Figure 7 is a further fragmentary view, in side elevation, of the structure shown in Figure 6, also half in section, the section being taken substantially in the vertical plane bisecting the device and as indicated by the line 7—7 of Figure 8.

Figure 8 is an end view of the device shown in Figures 6 and 7 with the follower wedge removed.

Figures 9, 10, and 11 are views corresponding in general to those of Figures 6, 7, and 8, but showing a different form of spring cap modifying the action of the compression springs upon the clutch mechanism. Figures 9 and 10 are each shown half in section, with the sections bisecting the device at right angles to each other and being taken respectively as indicated by the lines 9—9 and 10—10 of Figure 11.

Figures 12, 13, and 14 correspond also to Figures 6, 7, and 8 respectively, but show a further modification of the spring cap affecting the manner of bearing of the compression springs against the clutch mechanism and wherein Figures 12 and 13 are shown each half in section, with the sections substantially at right angles and each bisecting the device, the planes of said sections being indicated respectively by the lines 12—12 and 13—13 of Figure 14.

Figures 15 to 17 inclusive show the detailed form of the follower wedge, Figure 15 being a top plan view thereof, Figure 16 a side elevation, half in section, with the section bisecting the wedge substantially in the plane indicated by the line 16—16 of Figure 15, and Figure 17 an end elevation, half in section, with the section bisecting the device substantially as indicated by the line 17—17 of Figure 15, and Figure 17A showing a fragmentary sectional view through the shoe engaging surface of the wedge in a plane substantially at right angles thereto and as indicated by the line A—A of Figure 17.

Figures 18 to 20 inclusive show in detail one form of the inner friction shoe, Figure 18 being a plan view of the inner face thereof, Figure 19 a half section taken substantially in the plane indicated by the line 19—19 of Figure 18, Figure 19A showing a fragmentary section through the surfaces engaging the shoes of the other set substantially as indicated by the line A—A of Figure 19, and Figure 20 an end elevation taken from the right as seen in Figures 18 and 19.

Figures 21 to 23 inclusive show in detail one modification of the outer friction shoe, Figure 21 being a plan view of the inner face thereof, Figure 21A a fragmentary sectional view taken substantially in the plane indicated by the line A—A of Figure 21, Figure 22 an end elevation taken from the bottom as seen in Figure 21, and Figure 23 a half section substantially in the plane indicated by the line 23—23 of Figure 21.

Figures 24 to 26 inclusive show a modified form of outer friction shoe, Figure 24 being a plan view of the inner face thereof, Figure 25 an end elevation taken from the bottom as seen in Figure 24, Figure 26 a half section substantially in the plane indicated by the line 26—26 of Figure 24, and Figure 26A a fragmentary sectional view taken substantially in the plane indicated by the line A—A of Figure 26.

Figures 27 and 28 show in detail one form of spring cap, Figure 27 being a plan view thereof, and Figure 28 a side elevation.

Figures 29 and 30 show a modified form of spring cap, Figure 29 being a plan view thereof, and Figure 30 a side elevation, half in section, the section being taken substantially in the plane indicated by the line A—A of Figure 29.

Figures 31 and 32 show a further modified form of spring cap, Figure 31 being a plan view thereof, and Figure 32 a side elevation, half in section, the section being taken substantially in the plane indicated by the line A—A of Figure 31.

Describing the structure in greater detail and referring first to the modification shown in Figures 1 to 3, the housing 2 is of barrel-like form having a rectangular base 4 interrupted centrally thereof by the recess 6 defined by the inwardly projecting lug 8, said lug serving as positioning means for the outer compression spring 10 and affording a seat for the inner compression spring 12. Adjacent the base 4, the opposite lateral walls are cored out as at 14 to afford escape of water or other extraneous matter which may collect within the housing. The barrel is of generally oval form and presents adjacent its open end tapering internal friction surfaces extending substantially entirely around the open end thereof, said surfaces being of shallow V-shaped form and arranged in pairs along axes substantially at right angles to each other as best seen from the plan view of Figure 3, the smaller of said friction surfaces 16, 16 being aligned with the long diameter of said oval end and the larger of said surfaces 18, 18 being aligned along the short diameter thereof. The clutch mechanism comprises a pair of relatively small diametrically opposed inner shoes 20, 20 and a pair of relatively large outer friction shoes 22, 22, each shoe of each set having engagement with both shoes of the other set along diagonal planes as indicated at 24 (Figure 1). The overlapping areas of each inner shoe with respect to each outer shoe may best be noted from the plan view of Figure 3. Each outer shoe 22 has diagonal face engagement as at 26 on the spaced areas 28, 28 (Figure 17A) of the follower wedge 30, and the clutch mechanism, as a whole, is maintained in assembled relationship by the securing bolt 32, the nut of which is conveniently seated in the cup-like cavity formed in the outer face of the follower wedge 30, the head of said bolt being seated in the recess 6 at the opposite end of said housing. The annular outer edge of the follower wedge is afforded a flat surface at 34 for abutment with the usual follower block.

In this modification as in others shown herein, the outer friction shoes 22, 22 are afforded relatively great area as compared with the inner friction shoes 20, 20 in order to secure substantially equal pressure per unit area of all of said shoes against the friction surfaces on the housing. The diagonal face 26 of each outer friction shoe is interrupted centrally thereof by a shallow slot 36 (Figure 3) extending thereacross separating the areas 28, 28 which are in abutment with the corresponding areas 28, 28 on the wedge 30. Likewise, the diagonal face at 24 (Figure 1) of each inner shoe 20 is relieved centrally thereof by the transverse slot 38 extending thereacross, and the character of the engaging surfaces between the inner and outer shoes at 24 is well shown in the fragmentary sectional view of Figure 5. It may be noted that the spaced areas at 24, 24 on the inner shoe, which have abutment with the respective outer shoes 22, 22, lie in diverging planes as best seen from the sectional view of Figure 5. In this modification, the inner and outer compression springs 10 and 12 are both seated at their outer ends as at 40 against the inner faces of the projecting shelf-like portion 42, 42 of the inner shoes.

The modification shown in Figures 6 to 8 inclusive differs from that just described in that the spring cap 44 is interposed between the compression springs 10 and 12 and the shoes 120 of the inner set, said spring cap presenting on its outer face as at 46 (Figures 31 and 32) a frustum of a cone surface for engagement as at 47 with the diagonally arranged bottom face of the shelf portion 142 of the shoe 120. In this modification, the housing 2, the outer shoes 22, 22, and the follower wedge 30 are similar to the modification described in Figures 1 to 3. The engaging surfaces between the follower wedge and the shoes of the outer set as at 26 are similar to the corresponding surfaces of the previous modification, as are also the engaging surfaces between the shoes of respective sets as indicated at 24.

In the modification shown in Figures 9, 10, and 11, the same housing 2 is used, the same wedge block 30, and the same outer shoes 22, 22 having similar engaging surfaces with said wedge as at 26. In this modification also, the inner shoes 20, 20 are similar to those used in the modification of Figures 1 to 3, and the inner and outer shoes have similar engaging surfaces as at 24. In this modification, however, the inner compression spring 212 is afforded a seat as at 214 against the spring cap 144 and on the outer face of said cap and at opposite sides of the perimeter thereof are formed outwardly projecting lugs 216, 216 having abutment as at 218 against each outer shoe 22, whereby said compression spring 212 exerts pressure against the shoes of the outer set to facilitate release thereof. At the same time, the outer compression spring 210 is afforded a seat as at 211 against each inner shoe 20.

In the modification shown in Figures 12 to 14 inclusive, the housing 2, the wedge follower 30, the outer shoes 22, 22, and the inner shoes 120, 120 correspond to the similar parts of the modification shown in Figures 6 to 8. A composite spring cap 244 is used comprising an inner member 144, identical with that used in the modification shown in Figure 10, and an outer member 145, said outer member being generally similar to the spring cap 44 (Figure 6) but slotted at opposite sides as at 147, 147 to accommodate the upstanding lugs 216, 216 of the inner member 144. In this modification, the inner spring 312 is afforded a seat at 314 against the cap 144, said cap having abutment as at 318 against the inner face or base of the outer shoe 22 by means of the lug 216 which projects through the beforementioned slot 147. The outer compression spring 310 is afforded a seat as at 315 against the inner face of the spring cap 145, and said cap has diagonal face engagement as at 149 against the inner shoe 120.

The detail of the spring cap 44 (Figure 6) is shown in Figures 31 and 32. On the face opposite the shoe engaging surface 46, said spring cap is afforded an annular flange 319 extending around the perimeter thereof and affording positioning means for the inner compression spring. The detail of the spring cap 144 is shown in Figures 27 and 28. On its inner face opposite the lugs 216, 216, an annular flange 321 is afforded about its inner perimeter, also serving as positioning means for the inner compression spring. The detail of the spring cap 145 is shown in Figures 29 and 30. This cap also is afforded an annular flange 151 about the outer perimeter of its inner face serving to position the spring cap 144 with relation thereto.

The detail of the follower wedge is shown in Figures 15 to 17 inclusive. It comprises a cup-like structure of oval form having on opposite sides of its inner face the spaced friction surfaces 28, 28, already referred to, with an intervening relieved area or channel 29, said spaced diagonal surfaces 28, 28 at each side of the wedge follower lying in a single plane.

The outer friction shoe 401, shown in detail in Figures 21 to 23 inclusive, is generally similar to that shown in Figure 1 but differs therefrom in having a single flat follower engaging surface 403 extending completely thereacross. The V-shaped housing engaging friction surface 405 at the back of the shoe is well seen by a comparison of Figures 22 and 23, the taper to accommodate of said shoe to the tapering friction surfaces of the housing being clearly indicated. These detail figures also show the arrangement of the diagonal surfaces 24, 24 on the inner face of the shoe, and the sectional detail of Figure 21A shows the manner in which the surfaces 24 taper in two directions. In the forging operation, the shoe is afforded a cavity 407 centrally thereof in order to reduce weight. The outer friction shoe 501, shown in detail in Figures 24 to 26 inclusive, is similar in general structural form to that just described except that the follower engaging surface afforded on the outer face thereof is broken into two areas 503, 503 at opposite sides thereof, and an intervening shallow channel 505 is afforded therebetween. In this modification also, the diagonal surfaces 507, 507 at the inner end of the shoe are tapered in only one direction, thus differing from the modification shown in Figure 21.

The detail of the inner friction shoe 20 (Figure 1) is shown in Figures 18, 19, and 20. It comprises a solid body of material having a V-shaped outer wall 601 and an inwardly projecting shelf portion 42. The friction or housing engaging surface of said shoe is tapered as at 603 to accommodate said shoe to a corresponding taper on said housing. The outer face of the shelf portion 42 is diagonally arranged and afforded spaced surfaces 26, 26 for engagement with adjacent outer shoes, said surfaces 26 being spaced by the intervening shallow channel 605 and being positioned in diverging planes as best seen from the sectional view of Figure 19A. The inner face 607 of the shelf portion 42 lies in a plane substantially at right angles to the axis of the gear and affords a seat for the compression springs as already described.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a friction absorbing device, a housing having an oval open end with pairs of diametrically opposed tapering internal friction faces arranged respectively on the long and short diameters thereof, an inner compression spring, an outer compression spring, an inner spring cap, an outer spring cap, a wedge follower, and pairs of inner and outer friction shoes arranged in series between said spring caps and wedge follower and seated against said friction faces respectively with each inner shoe having diagonal face engagement with both outer shoes on spaced areas lying in diverging planes, said outer spring having abutment with said outer spring cap, said outer spring cap having diagonal face engagement with said inner shoes, said inner spring having abutment with said inner spring cap and said inner spring cap having means projecting through said outer spring cap for abutment with said outer shoes.

2. In a friction absorbing device, a housing having an oval open end with pairs of diametrically opposed tapering internal friction faces arranged respectively on the long and short diameters thereof, an inner compression spring, an outer compression spring, an inner spring cap, an outer spring cap, a wedge follower, and pairs of inner and outer friction shoes arranged in series between said spring caps and said wedge follower and seated against said friction faces respectively with each shoe of each set having diagonal face engagement with both shoes of the other set, said outer spring cap being seated against said outer spring and having diagonal face engagement with said inner shoes, and said inner spring cap being seated against said inner spring and having means extending through said outer spring cap for engagement with said outer shoes.

3. A friction absorbing device of series type, a barrel having an oval friction end with tapering friction faces aligned along the long and short axes thereof, a compression spring, a wedge block, and sets of inner and outer diametrically opposed friction shoes seated against said faces and aligned respectively on said long and short axes with the shoes of the outer set engaging said wedge follower and the shoes of said inner set abutting said spring and the shoes of respective sets abutting each other, each shoe of said outer set having diagonal face engagement with said wedge follower on spaced areas lying in a single plane and each inner shoe having diagonal face engagement with the two outer shoes on spaced areas lying in diverging planes.

4. In a friction absorbing device, a housing having an oval open end with pairs of diametrically opposed tapering internal friction faces arranged respectively on the long and short diameters thereof, an inner compression spring, an outer compression spring, an inner spring cap, an outer spring cap, a wedge follower, and pairs of inner and outer friction shoes arranged in series between said spring caps and said wedge follower and seated against said friction faces respectively with each inner shoe having diagonal face engagement with both outer shoes in spaced areas lying in diverging planes, said outer spring cap being positioned between said outer spring and said inner shoes, and said inner spring cap being positioned on said inner spring and having means engaging said outer shoes.

5. In a friction absorbing device of series type, a barrel having an oval friction end with tapering friction faces aligned along the long and short axes thereof, a compression spring, a wedge follower, and sets of inner and outer diametrically opposed friction shoes seated against said faces and aligned respectively on said long and short axes with the shoes of the outer set engaging said wedge follower and the shoes of said inner set abutting said spring and the shoes of respective sets abutting each other, each shoe of said outer set having diagonal face engagement with said wedge follower on spaced areas lying in a single plane, and each inner shoe having engagement with both outer shoes on diagonal faces lying in diverging planes.

6. In a friction absorbing device of clutch type having two sets of shoes arranged in series, a housing having an oval friction end with pairs of tapering internal friction faces arranged respectively along the long and short diameters thereof, a plurality of compression springs, a wedge follower, and inner and outer sets of diametrically opposed friction shoes seated respectively against said friction faces with each shoe of each set having diagonal face engagement with both shoes of the other set, and a spring cap seated on one of said compression springs and having means in abutment with the shoes of said outer set, another of said compression springs having abutment with the shoes of said inner set.

7. In a friction absorbing device of series type, a housing having an oval friction end with pairs of tapering internal V-shaped friction faces arranged on the long and short axes of said oval end, inner and outer compression springs, a spring cap, a wedge follower, and pairs of inner and outer friction shoes arranged in series between said wedge follower and said springs with the shoes of respective sets seated against said sets of friction faces respectively, each shoe of each pair having frictional engagement with both shoes of the other pair, said spring cap being seated on said inner spring and having abutment with said outer shoes and said outer spring having abutment with said inner shoes.

8. In a friction absorbing device of series clutch type, a housing having an oval friction end with tapering internal friction faces, a compression spring, a spring cap, a wedge follower, and two pairs of diametrically opposed friction shoes arranged in series between said spring cap and said wedge follower with each shoe of one set having diagonal face engagement with the two shoes of the other set on spaced areas lying in diverging planes, said spring cap having diagonal face engagement with the shoes of one set, and each shoe of said other set having diagonal face engagement with said wedge follower on spaced areas lying in a single plane.

9. In a friction absorbing device of clutch type having two sets of shoes arranged in series, a housing having an oval friction end with pairs of tapering internal friction faces arranged respectively along the long and short diameters thereof, a plurality of compression springs, a wedge follower, and inner and outer sets of diametrically opposed friction shoes seated respectively against said friction faces with each shoe of each set having diagonal face engagement with both shoes of the other set, and a spring cap seated on one of said compression springs and having means in abutment with the shoes of said outer set.

10. In a friction absorbing device of series type, a housing having an oval open end with pairs of tapering internal friction faces arranged on the long and short axes thereof, inner and outer compression springs, inner and outer spring caps, a wedge follower, and pairs of inner and outer diametrically opposed friction shoes seated respectively against said sets of faces between said spring caps and said wedge follower, said inner spring cap being seated on said inner spring and having means engaging said outer shoes, and said outer spring cap being seated on said outer spring and having diagonal face engagement with said inner shoes.

11. In a friction absorbing device of series type, a housing having an oval friction end with pairs of tapering internal V-shaped friction faces arranged on the long and short axes of said oval end, inner and outer compression springs, a spring cap, a wedge follower, and pairs of inner and outer friction shoes arranged in series between said wedge follower and said springs with the shoes of respective sets seated against said sets of friction faces respectively, each shoe of each pair having diagonal face engagement with both shoes of the other pair, said spring cap having abutment with said inner spring and said outer shoes, and said inner friction shoes being seated on said outer spring.

12. In a friction absorbing device of series type, a housing having a friction end of generally oval form with two sets of friction surfaces arranged along the long and short diameters thereof, a compression spring, a follower wedge, and inner and outer sets of shoes arranged in series between said spring and wedge with the shoes of respective sets aligned along said long and short diameters respectively, each inner shoe having diagonal face engagement with both outer shoes on spaced areas lying in inwardly directed diverging planes.

13. In a friction absorbing device of series type, a housing having a friction end of generally oval form with two sets of friction surfaces arranged along the long and short diameters thereof, a compression spring, a follower wedge, and inner and outer sets of shoes arranged in series between said spring and wedge with the shoes of respective sets aligned along said long and short diameters respectively, each inner shoe having diagonal face engagement with the two outer shoes on spaced areas lying in diverging planes.

14. In a friction absorbing device, a friction shoe having an outer wall with an external friction surface, a centrally formed shelf on the opposite side thereof having a diagonally arranged top face comprising a plurality of spaced friction areas with an intervening relieved portion, said areas being positioned in diverging planes, said shelf having a diagonally arranged bottom face.

15. A friction shoe having a back wall with a tapering friction face for abutment with a friction housing and having on its opposite side a diagonally arranged outwardly directed friction face comprising a plurality of spaced areas with an intervening relieved portion, said spaced areas lying in a single plane.

16. In a friction absorbing device, a friction shoe having an outer wall with an external diagonal friction surface, and a centrally formed shelf on the opposite side thereof having a diagonally arranged top face comprising a plurality of spaced friction areas with an intervening relieved portion, said areas being positioned in diverging planes.

17. In a friction absorbing device, a friction shoe having an outer wall with an external friction surface, and a centrally formed shelf on the opposite side thereof having a diagonally arranged top face comprising a plurality of spaced friction areas with an intervening relieved portion, said areas being positioned in diverging planes.

18. A friction shoe having a back wall with a tapering friction face for abutment with a friction housing and having on its opposite side a diagonally arranged outwardly directed friction face, and a plurality of diagonally arranged inwardly directed diverging friction faces adjacent its inner end.

19. In a friction absorbing device, a follower wedge of oval cup shape, diagonal inwardly directed friction faces on opposite sides thereof, each of said faces comprising a plurality of spaced areas lying in a single plane, and an intervening relieved area.

20. In a friction absorbing device of series type, a housing having a friction end of generally oval form with two sets of friction surfaces arranged along the long and short diameters thereof, a compression spring, a follower wedge, and inner and outer sets of shoes arranged in series between said spring and wedge with the shoes of respective sets aligned along said long and short diameters respectively, each inner shoe having face engagement with both outer shoes on spaced areas lying in downwardly and outwardly directed diverging planes.

21. In a friction absorbing device of series type, a housing having a friction end with a plurality of sets of integral friction surfaces arranged therearound, a compression spring, a follower wedge, and inner and outer sets of shoes arranged in series between said spring and wedge with the shoes of respective sets engaging respective sets of said friction surfaces with each inner shoe having diagonal face engagement with two outer shoes on spaced areas lying in diverging planes.

22. In a friction absorbing device of series type, a housing having a friction end of generally oval form with two sets of friction surfaces arranged along the long and short diameters thereof, a compression spring, a follower wedge, and inner and outer sets of shoes arranged in series between said spring and wedge with the shoes of respective sets aligned along said long and short diameters respectively, each inner shoe having diagonal V-shaped engagement with said outer shoes.

23. In a friction absorbing device, a housing having an oval friction end with sets of tapering internal friction faces arranged respectively along the long and short axes of said oval end, a compression spring, a spring cap, a wedge follower, and pairs of inner and outer friction shoes seated respectively against said sets of friction faces between said spring cap and said wedge follower with each shoe of one pair having diagonal face engagement with both shoes of the other pair along spaced areas lying in diverging planes, said inner shoes having diagonal face engagement with said spring cap.

24. In a friction absorbing device, a housing having a friction end with diagonally arranged internal friction faces disposed therearound, a compression spring, a spring cap, a wedge follower, and pairs of inner and outer friction shoes seated respectively against said friction faces between said spring cap and said wedge follower with each shoe of one pair having face engagement with both shoes of the other pair along spaced areas lying in diverging planes, said inner shoes having diagonal face engagement with said spring cap.

25. In a friction absorbing device of series type, a barrel having a friction end with tapering friction faces arranged therearound, a compressed spring, a wedge follower, and sets of inner and outer diametrically opposed friction shoes seated against said faces with the shoes of the outer set engaging said wedge follower and the shoes of said inner set abutting said spring and the shoes of respective sets abutting each other, each shoe of said outer set having diagonal face engagement with said wedge follower on spaced areas lying in a single plane, and each inner shoe having engagement with both outer shoes on diagonal faces lying in downwardly and outwardly diverging spaced areas.

26. In a friction absorbing device of series type, a housing having a friction end with pairs of tapering internal V-shaped friction faces arranged therearound, inner and outer compression springs, a spring cap, a wedge follower and pairs of inner and outer friction shoes arranged in series between said wedge follower and said springs with the shoes of respective pairs seated against said pairs of friction faces respectively, each shoe of each pair having frictional engagement with both shoes of the other pair, said spring cap having abutment with said inner spring and having means in abutment with said outer shoes.

27. In a friction absorbing device of series type, a barrel having an oval friction end with tapering friction faces aligned along the long and short axes thereof, a compression spring, a wedge block, and sets of inner and outer diametrically opposed friction shoes seated against said faces and aligned respectively on said long and short axes with the shoes of the outer set engaging said wedge follower and the shoes of said inner set abutting said spring and the shoes of respective sets abutting each other, each shoe of said outer set having diagonal face engagement with said wedge follower on spaced areas lying in a single plane and each inner shoe having face engagement with said outer shoes on spaced diagonal areas.

ROBERT B. COTTRELL.